April 19, 1932.  C. A. LAMB  1,854,339
WEAR PREVENTER
Filed June 5, 1929  2 Sheets-Sheet 1
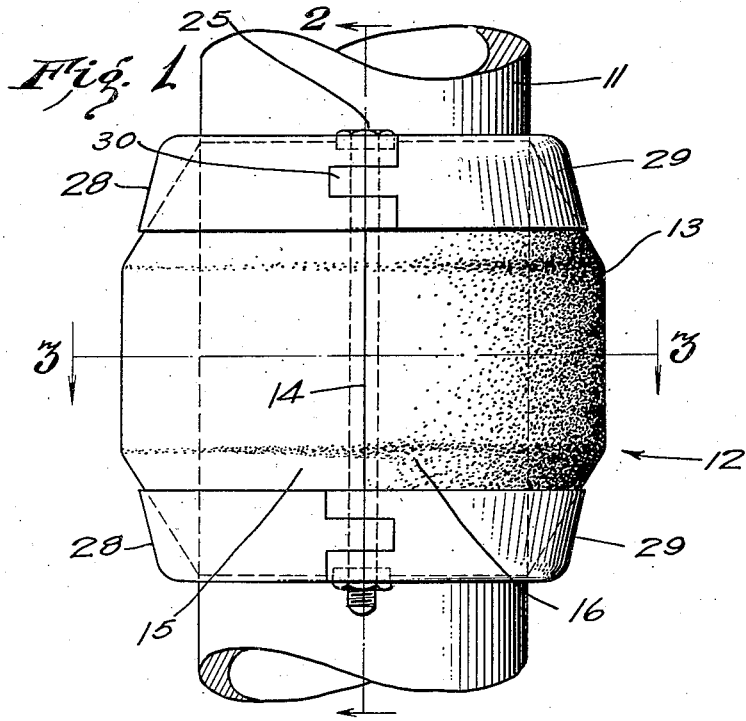
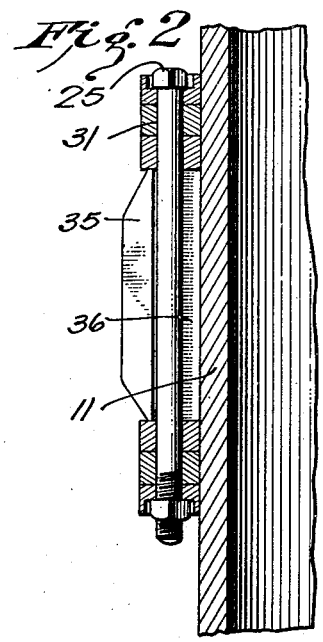
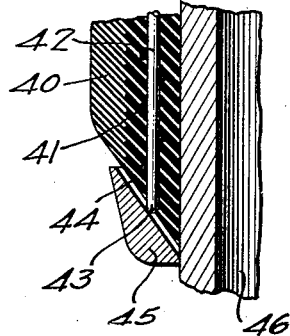
INVENTOR.
Charles A. Lamb
BY
ATTORNEYS.

April 19, 1932.  C. A. LAMB  1,854,339
WEAR PREVENTER
Filed June 5, 1929   2 Sheets-Sheet 2
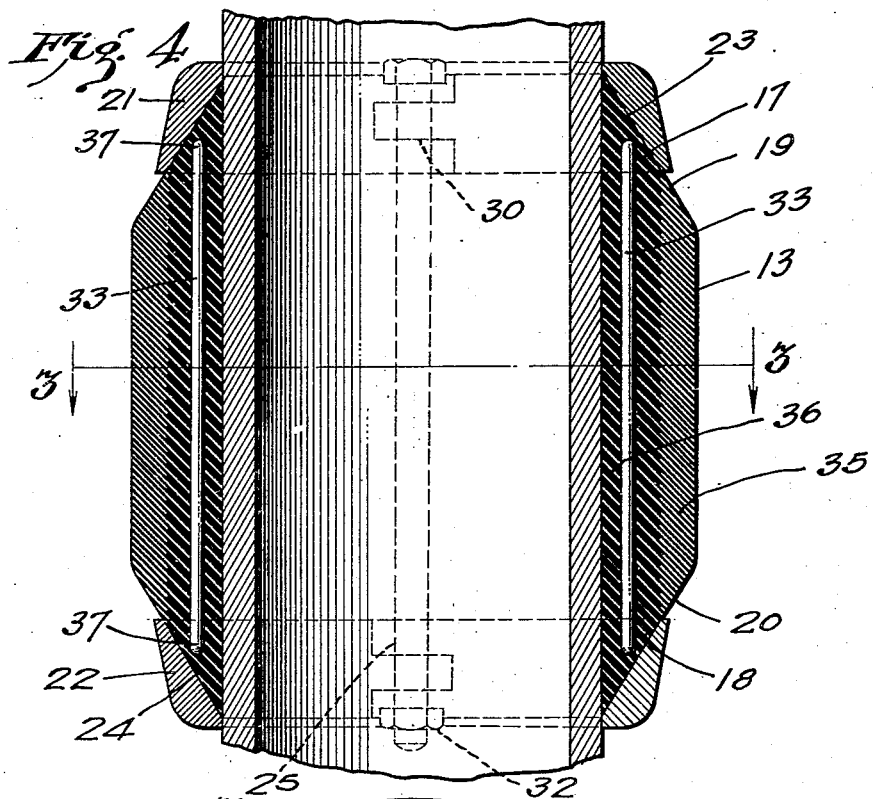
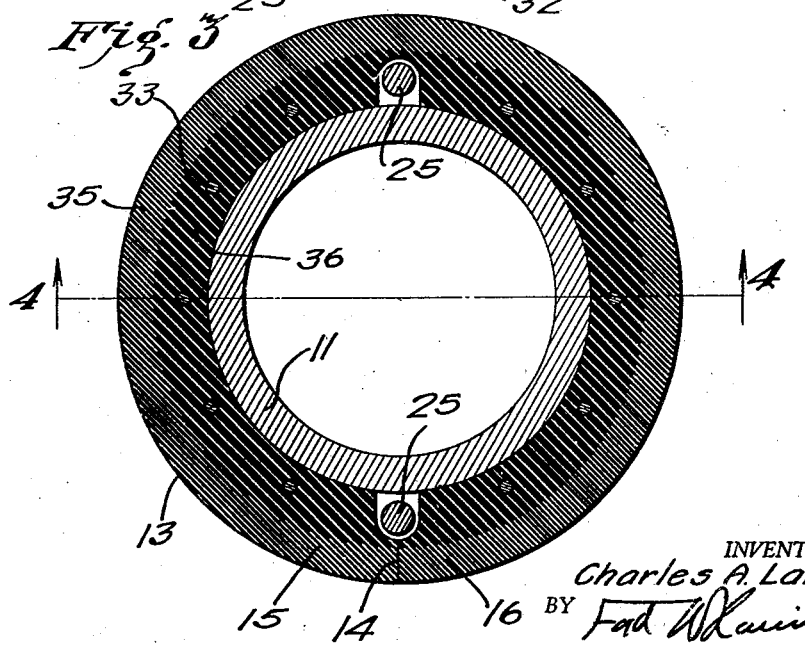
INVENTOR.
Charles A. Lamb
BY
ATTORNEYS.

Patented Apr. 19, 1932

1,854,339

UNITED STATES PATENT OFFICE

CHARLES A. LAMB, OF LOS ANGELES, CALIFORNIA

WEAR PREVENTER

Application filed June 5, 1929. Serial No. 368,459.

This invention relates to wear preventers of the general character employed in the drilling of wells for preventing or minimizing engagement between the drill shaft or drill pipe and the well casing or wall of the hole.

In the general classification of wear preventers are included rubber sleeves which are secured on the drill pipe or shaft intended for rotation of a drilling tool in a well, these rubber sleeves resiliently engaging the casing which has been set in the hole, or if such casing has not been set, engaging the bare formation walls through which the hole has been drilled. Rubber and certain rubber compounds have been found particularly suitable for use in wear preventers for the reason that rubber is especially suitable for lubrication by water containing fluid mixtures such as the drilling mud employed in the rotary process of drilling wells.

My present invention has for an object to provide a wear preventer which may be quickly clamped in operating position on a rotary drill pipe and which has locking means incorporated therewith, whereby the wear preventer will be held substantially immovable on the drill pipe.

It is also an object of the invention to provide a wear preventer including a resilient rubber or rubber compound sleeve, such sleeve being split longitudinally down one side so that the sleeve may be opened out and placed on a drill pipe, and ring members operative at the ends of the split sleeve in a manner to secure the sleeve on the drill pipe.

A further object of the invention is to provide a split sleeve of the above character having reinforcement means held in the resilient material of the sleeve.

A further object of the invention is to provide a split sleeve of the above character having substantially rigid bars extended longitudinally within or through the resilient material of the sleeve, these bars cooperating to provide an efficient securement of the wear preventer on the pipe.

Further objects and advantages of the invention will appear throughout the following part of the specification.

Referring to the drawings which are for illustrative purposes only,

Fig. 1 is an elevational view showing a preferred embodiment of my invention mounted on a drill pipe.

Fig. 2 is a fragmentary section on substantially the plane indicated by the line 2—2 of Fig. 1.

Fig. 3 is a horizontal cross-section on the plane indicated by the line 3—3 of Fig. 1.

Fig. 4 is a horizontal section as indicated by the line 4—4 of Fig. 3.

Fig. 5 is a fragmentary sectional detail view of an alternative form or method of reinforcing employed in the practice of the invention.

In Fig. 1 of the drawings I show a portion of a rotary drill pipe 11 constituting a shaft adapted to a utility with which a wear preventer of the general character represented in my present invention is particularly useful.

My preferred form of wear preventer, as indicated at 12 in Fig. 1, includes a sleeve member 13 of resilient material such as rubber or rubber compound having wear resisting qualities, making same valuable for utility in preventing wear of drill pipe, connecting means or tool joints, and the metal casing of the well through which the drill pipe is extended during the drilling operation.

To facilitate placing of the sleeve 13 on the drill pipe 11, the sleeve 13 is split axially or longitudinally as indicated at 14 in Figs. 1 and 3, thereby enabling the splitting apart of the portions 15 and 16 adjacent to the split 14 to an extent permitting the placing of the sleeve 13 on the drill pipe 11 in a lateral direction, thus making it possible to quickly install the sleeve on a drill pipe between the couplings.

As best shown in Fig. 4, the ends 17 and 18 of the sleeve 13 are of external conical form, as indicated at 19 and 20, so that locking means in the form of ring members 21 and 22 having cooperative internal conical faces 23 and 24 may be forced against the tapered or conical ends 17 and 18 by means of bolts 25 and accomplish a locking or constriction of the sleeve 13 on the drill pipe 11 in a manner to secure the wear preventer against movement on the drill pipe 11.

The ring members 21 and 22 are split form also, so that they may be readily placed on an intermediate portion of the drill pipe 11 between collars or couplings, and preferably include two cooperating semi-circular half rings 28 and 29, the ends of which are dovetailed or interlocking, as indicated at 30, these interlocking ends being equipped, as shown in Fig. 2, with longitudinal holes 31 through which the pin means or bolts 25 extend, there being a nut 32 on each bolt, which by being tightened draws the ring members 21 and 22 relatively together, causing these ring members to be pressurably applied to the tapered ends 17 and 18 of the sleeve 13 so as to accomplish the desired locking action.

An important feature of the invention resides in the inclusion of reinforcing in the sleeve 13, which cooperates in bettering the locking action, but which is of such character as not to interfere with the opening up of the sleeve, whereby to place same on a shaft such as represented by the drill pipe 11.

In Figs. 3 and 4 I show this reinforcement as having the form of longitudinal bars 33 extended within the resilient material forming the sleeve. It will be noticed that these bars 33, which may be made of rigid material, serve to receive the end thrust of the ring members 21 and 22, thereby preventing the central portions of the sleeve from buckling outwardly. In other words, this reinforcement is of such character as to hold the wall of the sleeve 13 to cylindrical form and against the surface of the drill pipe 11.

It is desirable in the practice of the invention to use a fairly resilient material near the outer face or in the outer portion of the sleeve 13, as indicated at 35; therefore, in order to preserve ample strength and rigidity in the sleeve structure a tough and relatively non-resilient compound is employed for the inner portion 36 of the sleeve, the reinforcement 33 being preferably placed in the layer of material 36.

In Fig. 4, the reinforcing bars 33 are shown with the ends 37 thereof stopped off adjacent to the end faces 19 and 20 of the sleeve 13; but it is to be understood that this form of reinforcement is not entirely necessary to a satisfactory operation, but other forms of reinforcing may be suitably employed.

In Fig. 5 I have shown an end 40 of a sleeve having a reinforcing mesh consisting of circularly placed wires 41 and radial or longitudinal bars 42, the ends 43 of which project slightly beyond the conical face 44 which cooperates with a ring 45 in locking the wear preventer assembly in place on a drill pipe 46.

Although I have shown a simple and effective embodiment of my invention, I recognize that certain parts thereof are representative of other parts, elements, or structures which may be employed to function in an equivalent manner; therefore it is to be understood that the invention is in no manner limited to the details of the disclosure but that the scope thereof is as defined in the following claims.

I claim as my invention:

1. A protector of the character described, including: a sleeve of resilient material having reinforcing members therein, adapted to surround a shaft; and means engaging the ends of said sleeve in a manner causing said sleeve to grip the shaft.

2. A protector of the character described, including: a split sleeve of resilient material having reinforcing elements therein, adapted to surround a shaft; and means adapted for forcible application in axial direction to the ends of said sleeve to cause said sleeve to grip said shaft.

3. A protector of the character described, including: a split sleeve of resilient material, adapted to surround a shaft axis; reinforcing members extending within the resilient material of said sleeve to prevent bulging of said sleeve; and securing means including members having internal conical faces engaging the ends of said sleeve.

4. A protector of the character described, including: a sleeve adapted to surround a shaft, said sleeve having the ends thereof externally conical in form; members on said shaft at the ends of said sleeve, having internal conical faces cooperating with said ends of said sleeve; split rings on said shaft having internal conical faces engaging the said conical ends of said sleeve; and means traversing said sleeve in a longitudinal direction for forcing said rings relatively together.

5. A protector of the character described, including: a split sleeve of a resilient material adapted to surround a shaft, the outer portion of said sleeve having wear resisting qualities; reinforcing bars extending longitudinally within the material of said sleeve; split rings on said shaft at the end of said sleeve, having internal conical faces adapted to engage the ends of said sleeve; and bolt members traversing said sleeve for pulling said split rings relatively together.

6. A protector of the character described, including: a split sleeve of resilient material adapted to surround a shaft, said sleeve having longitudinal channels therein; reinforcing bars extended longitudinally within the material of said sleeve; locking rings at the ends of said sleeve having internal conical faces adapted for engagement with the ends of said sleeve; and bolt members extending between said rings through said channels in said sleeve for moving said rings relatively together into forcible engagement with the ends of said sleeve.

7. A casing protector of the character described, including: a protector sleeve adapted to fit around a pipe, said sleeve consisting of an inner reinforcing wall of relatively hard rubber material, and an outer wall of resilient rubber material for engagement with the wall of a well; means having internal conical faces adapted for forcible application to the ends of said sleeve to cause said sleeve to grip said pipe; and reinforcing bars extending longitudinally within said sleeve for resisting bulging of said sleeve.

8. A protector of the character described, including: a split sleeve of resilient material adapted to surround a shaft, said sleeve consisting of an inner reinforcing wall of relatively hard material, and an outer wall of relatively soft material and having longitudinal channels therein; reinforcing bars extended longitudinally within the material of said sleeve; locking rings at the ends of said sleeve having internal conical faces adapted for engagement with the ends of said sleeve; and bolt members extending between said rings through said channels in said sleeve for moving said rings relatively together into forcible engagement with the ends of said sleeve.

In testimony whereof, I have hereunto set my hand at Los Angeles, California, this 31st day of May, 1929.

CHARLES A. LAMB.